United States Patent
Wainner et al.

(10) Patent No.: US 9,294,270 B2
(45) Date of Patent: Mar. 22, 2016

(54) DETECTION OF STALE ENCRYPTION POLICY BY GROUP MEMBERS

(75) Inventors: Warren Scott Wainner, Sterling, VA (US); Sheela D. Rowles, Cupertino, CA (US); Brian E. Weis, San Jose, CA (US); David Arthur McGrew, Poolesville, MD (US); Scott R. Fluhrer, North Attleboro, MA (US); Kavitha Kamarthy, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1137 days.

(21) Appl. No.: 12/652,324

(22) Filed: Jan. 5, 2010

(65) Prior Publication Data
US 2011/0164752 A1    Jul. 7, 2011

(51) Int. Cl.
*H04L 9/08* (2006.01)
*H04L 29/06* (2006.01)

(52) U.S. Cl.
CPC .......... *H04L 9/0833* (2013.01); *H04L 9/0891* (2013.01); *H04L 63/0428* (2013.01); *H04L 63/104* (2013.01); *H04L 63/20* (2013.01)

(58) Field of Classification Search
CPC ........................................................ H04L 9/08
USPC ........................................................ 380/279
See application file for complete search history.

(56) References Cited

U.S. PATENT DOCUMENTS

| | | | | |
|---|---|---|---|---|
| 7,234,058 B1* | 6/2007 | Baugher et al. | | 713/163 |
| 7,234,063 B1* | 6/2007 | Baugher et al. | | 713/189 |
| 7,392,382 B1* | 6/2008 | Weis et al. | | 713/163 |
| 2002/0095603 A1* | 7/2002 | Godwin et al. | | 713/201 |
| 2002/0120763 A1* | 8/2002 | Miloushev et al. | | 709/230 |
| 2006/0018333 A1* | 1/2006 | Windisch et al. | | 370/432 |
| 2006/0174320 A1* | 8/2006 | Maru et al. | | 726/1 |
| 2007/0016663 A1* | 1/2007 | Weis | | 709/223 |
| 2007/0143600 A1* | 6/2007 | Kellil | | H04L 9/0822 713/163 |
| 2007/0244717 A1* | 10/2007 | Baptista et al. | | 705/2 |
| 2008/0307054 A1* | 12/2008 | Kamarthy | | H04L 63/065 709/206 |
| 2008/0313461 A1* | 12/2008 | Detienne | | 713/170 |
| 2008/0320303 A1* | 12/2008 | Khalid | | H04L 9/0833 713/163 |
| 2009/0122985 A1* | 5/2009 | Khalid | | H04L 9/0833 380/255 |
| 2009/0150668 A1* | 6/2009 | Liu | | H04L 9/0891 713/163 |
| 2009/0271612 A1* | 10/2009 | Liu | | H04L 9/0833 713/151 |
| 2010/0122084 A1* | 5/2010 | Liu | | H04L 9/0833 713/163 |
| 2010/0135304 A1* | 6/2010 | Mulligan et al. | | 370/395.3 |
| 2011/0182426 A1* | 7/2011 | Roosta | | H04L 9/0833 380/255 |

OTHER PUBLICATIONS

B. Weis et al., "The Group Domain of Interpretation," Internet Engineering Task Force (IETF), Oct. 2011, pp. 1-64.*
Catherine Meadows, "Formalizing GDOI Group Key Management Requirments in NPATRL," CCS'01, Nov. 5-8, 2001, pp. 235-244.*
Cisco Systems, Inc. "Group Encrypted Transport VPN (Get VPN) Design and Implementation Guide," Document Version 1.0; Aug. 2008, pp. 1-140.

* cited by examiner

*Primary Examiner* — Luu Pham
*Assistant Examiner* — Canh Le
(74) *Attorney, Agent, or Firm* — Campbell Stephenson LLP (57) ABSTRACT

Various techniques that allow group members to detect the use of stale encryption policy by other group members are disclosed. One method involves receiving a message from a first group member via a network. The message is received by a second group member. The method then detects that the first group member is not using a most recent policy update supplied by a key server, in response to information in the message. In response, a notification message can be sent from the second group member. The notification message indicates that at least one group member is not using the most recently policy update. The notification message can be sent to the key server or towards the first group member.

19 Claims, 10 Drawing Sheets

DETECTION OF STALE ENCRYPTION POLICY BY GROUP MEMBERS

FIELD OF THE INVENTION

This invention relates generally to networking and, more particularly, to encryption schemes that rely upon key servers to distribute common keys to group members.

BACKGROUND

In many situations, it is desirable to encrypt communications sent over a network. For example, various government regulations, such as Health Insurance Portability and Accountability Act (HIPAA), Gramm-Leach-Bliley Act (GLBA), and Payment Card Industry Data Security Standard (PCI DSS), require the use of encryption, even on private networks. Such regulations can be satisfied by configuring network devices, such as routers, to encrypt messages received from client machines before transmitting those messages over the network. Receiving network devices then decrypt the transmitted messages before passing the messages to the recipient client machines.

In order for the network devices to be able to successfully encrypt and decrypt messages, all of the network devices participating in the encryption scheme need to use the same encryption keys and policies. A special network device can act as a key server, which distributes encryption keys and policies to all of the participating network devices. The key server can routinely update the keys and policies in order to provide increased security.

In some circumstances, a participating network device may not receive the new keys and policies distributed by the key server. For example, transient network errors may prevent the network device from receiving a policy update. As a result, that network device will no longer be able to successfully participate in the encryption scheme, since that network device will be using outdated keys and/or policies. In an attempt to prevent this scenario, key servers are often configured to retransmit policy updates to participating network devices that fail to acknowledge policy updates. Unfortunately, this solution does not scale well as the number of participating network devices increases, since the key server may effectively be overwhelmed by acknowledgments.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Overview

Group members participating in an encryption scheme can monitor messages encrypted by other group members. By comparing information within messages received from another group member to information maintained locally, each group member can detect whether the other group member is using the current encryption policy. If a group member detects that the other group member is not using the current encryption policy, the group member can send a message to the other group member and/or to a key server.

Example Embodiments

Figure 1:
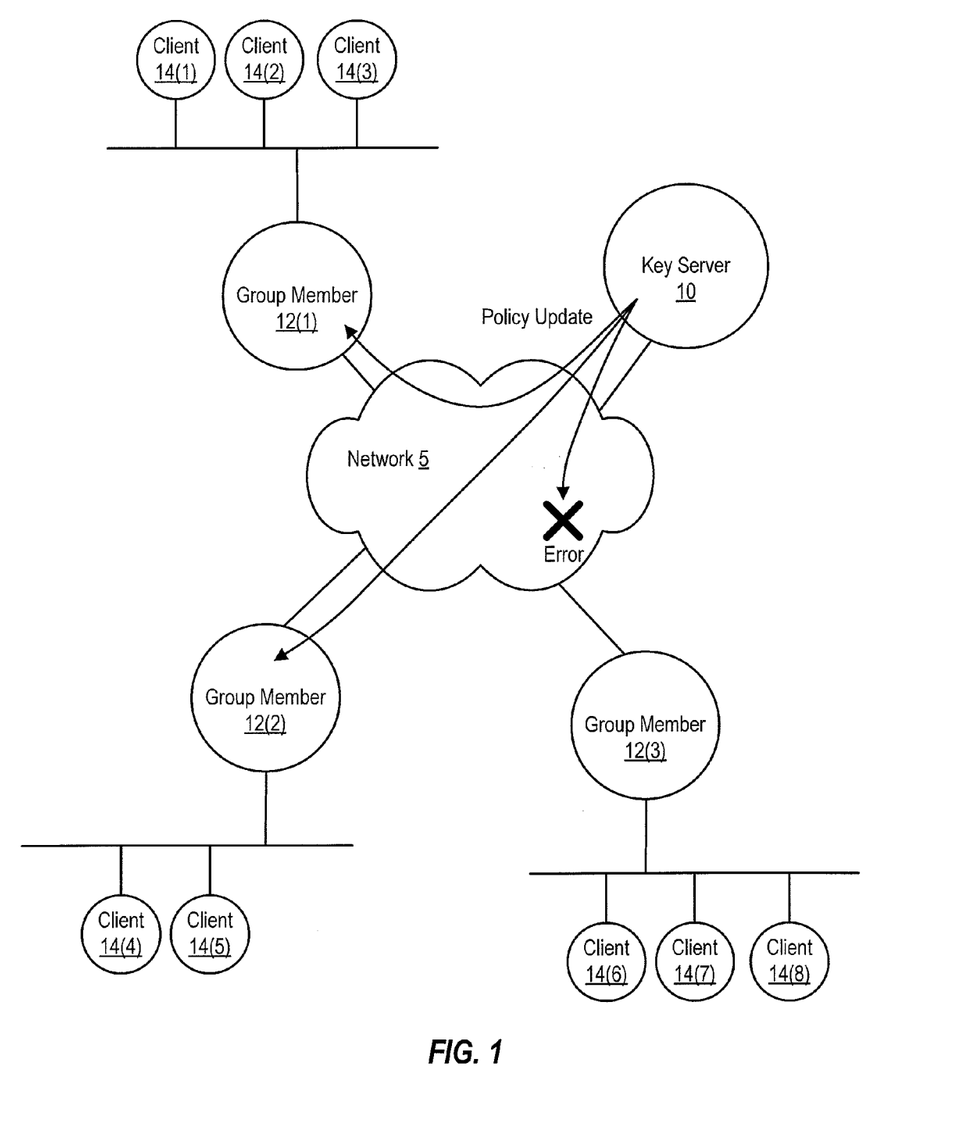
FIG. 1 is a block diagram of a system that includes several group members participating in an encryption scheme managed by a key server, according to one embodiment.

FIG. 1 is a block diagram of a system that includes several group members participating in an encryption scheme managed by a key server. As shown, system includes a key management server (referred to as a "key server" herein) 10, as well as three group members 12(1), 12(2), and 12(3). Group members 12(1)-12(3) are network devices that are configured as group members of the same key management group. In some embodiments, the key server 10 and group members 12(1)-12(3) implement a Group Encrypted Transport (GET) based network. It is noted that other embodiments can include different numbers and arrangements of network devices and key servers than are shown in this example. For example, an alternative embodiment can include multiple key servers and/or significantly more group members than are shown in the illustrated example.

Key server 10 and group members 12(1)-12(3) are coupled by network 5. Network 5 can include one or more storage, local, and/or wide area networks. Network 5 can be implemented using various topologies, communication protocols, and physical links (e.g., wireless links, coaxial cables, and the like). Network 5 may include both logical and physical links. For example, in one embodiment, group member 12(2) can be coupled to key server 10 by a physical Ethernet link, while group member 12(1) is coupled to key server 10 by a logical tunnel.

Group members 12(1)-12(3) can each be one of various types of network devices, including routers, bridges, gateways, switches, and the like. Some group members (not shown) may also be end devices, host devices, or client devices (e.g., such as personal computers). Some group members can also be configured to operate as a key server. Thus, the same device (e.g., the same network device) can be configured as both a key server and a group member. Alternatively, the key server and group members can be configured on different devices, as shown in FIG. 1.

Each group member is configured to encrypt content generated by a client according to the encryption scheme and to transmit that encrypted content to another group member via network 5. Similarly, each group member is configured to receive messages containing encrypted content, decrypt the encrypted content according to the encryption scheme, and then deliver the decrypted content to the appropriate client(s). In this example, group member 12(1) provides encryption for clients 14(1), 14(2), and 14(3); group member 12(2) provides encryption for clients 14(4) and 14(5); and group member 12(3) provides encryption for clients 14(6), 14(7), and 14(8). It is noted that the number of clients coupled to a given group member can vary, as can the total number of clients included within the overall system. In one embodiment, the group members act as Virtual Private Network (VPN) gateways, allowing all of the VPN gateways to encrypt and decrypt the IP multicast packets.

In general, a key server, such as key server 10, is a network component that provides other network components with cryptographic policy and/or encryption keys. As used herein, the teem "policy" is used to describe information that includes one or more encryption keys ("keys") and/or non-key policy information (e.g., such as information identifying one or more of an encryption algorithm, hash algorithm, group identifier, lifetime or the policy and/or key, and the like). In some embodiments, the key servers are Group Domain of Interpretation (GDOI) servers. Alternatively, key servers can implement other key management protocols, such as Group Domain of Interpretation version two (GDOIv2) or Group Secure Association Key Management Protocol (GSAKMP).

Group members 12(1)-12(3) obtain policy from key server 10 by registering with key server 10. When a group member attempts to register with a key server, the key server first authenticates and authorizes the group member. If the group member is successfully authenticated and authorized, the key server will complete the registration process by sending the group member the appropriate policy. Once a group member has received policy from a key server, the group member will use the key(s) to encrypt and decrypt communications. Group members that receive the same policy can communicate together as a group.

Key server 10 maintains a database or other data structure that identifies each network device that is currently registered to participate in the encryption scheme for which key server 10 is distributing policy. As new network devices register, and as existing group members leave the group (e.g., due to failure, network reconfiguration, or the like), key server 10 updates this data structure.

If the policy is updated, key server 10 will send the updated policy (i.e., key(s) and/or non-key policy information) to each currently registered group member. The policy can be routinely updated (e.g., on a periodic basis or in response to predetermined stimuli) in order to provide enhanced security. Policy updates can be encrypted for security. The process by which a key server sends policy updates can also be referred to as a rekey process, and the messages that contain policy updates can also be referred to as rekey messages.

In some embodiments, key server 10 sends policy updates via multicast messages (i.e., messages sent to a multicast address associated with a multicast group that all of the group members have joined). In at least some such embodiments, the key server may not expect group members to acknowledge receipt of policy updates.

As noted above, in certain situations, some group members may fail to receive the updated policy. For example, transient network conditions may prevent a group member from receiving a policy update message. In some situations, the particular network hardware implementing the data plane (in which normal messages encrypted by group members are sent) may not be the same as that implementing the control plane (in which policy update messages are sent). Thus, a group member that is still able to send normal messages may nonetheless miss a policy update from the key server. Worse still, the key server may not be able to detect such situations (e.g., as noted above, it can be undesirable to require that all policy updates be acknowledged). This can lead to errors both in message communication (e.g., if one group member is not using the current key to encrypt its messages) and in the key server's list of current group members (e.g., if a non-current group member is still identified as a current group member).

Thus, any group member that is not using the current policy will no longer be able to successfully encrypt and decrypt information for its clients and may be incorrectly identified as a current group member by the key server. To guard against these situations, each group member is configured to monitor network traffic received via network 5 for evidence that another group member is not using the current policy. In response to detecting that another group member is not using the current policy, a group member can send a notification message, which indicates that another group member has stale (e.g., non-current) policy. The group member that detects the stale policy can send this message to the key server, the group member that is not using the current policy, or both the key server and the other group member. In response to receiving such a notification message, the other group member can attempt to refresh its policy (e.g., by requesting the current policy from the key server; extracting the current policy from the notification message, if included; and the like). The key server can respond to such a message by attempting to update the other group member's policy and/or by updating its database to exclude the other group member. More details regarding possible implementations of the notification message and possible techniques for processing notification messages are provided below.

This notification scheme relies upon the fact that, even though communication between the key server and a particular group member may be impossible or disrupted, that group member may still be able to communicate with one or more other group members. Thus, even if a group member is unable to receive updates from the key server, other group members can identify that group member and take actions that may either result in the most recent policy update being provided to that group member or cause the group member to be removed from the group.

Figure 2:
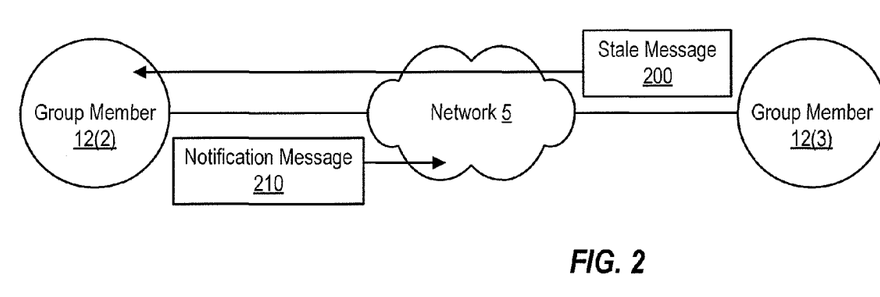
FIG. 2 is a block diagram illustrating messages that can be sent from group members participating in an encryption scheme managed by a key server, according to one embodiment.

FIG. 2 is a block diagram illustrating the types of messages that can be sent from group members participating in an encryption scheme managed by a key server. In this example, group member 12(2) is coupled to group member 12(3) by network 5.

As shown in FIG. 2, group member 12(3) initially sends a stale message 200 to group member 12(3) via network 5. Message 200 is a "stale" message because it has been encrypted using a valid, unexpired policy that predates the current policy. In other words, group member 12(3) is not using the current policy to perform encryption at the time that stale message 200 is sent, even though the current policy was distributed to all group members before stale message 200 was sent.

Group member 12(2) receives stale message 200 and detects, based upon information in stale message 200, that group member 12(3) is not using the current policy. In particular, group member 12(2) can compare information in the message to information maintained by group member 12(2). Group member 12(2) can detect that message 200 is a stale message based upon the outcome of this comparison (e.g., if the comparison shows that the information in the message does not equal the information maintained by the group member 12(2), group member 12(2) can detect that message 200 is stale). In response to detecting that group member 12(3) is not using the current policy, group member 12(2) sends at least one notification message 210 via the network. Notification message 210 indicates that at least one group member is not using the current policy. A device receiving notification message 210 can determine that at least one group member is not using the current policy and, if needed, take responsive action.

Group member 12(2) can detect that another group member has stale policy in a variety of different ways. For example, in one embodiment, group member 12(2) can maintain information identifying the current policy (e.g., in the form of a security parameters index (SPI) in IPSec, a key identifier (KeyID), a timestamp associated with the current policy, a policy sequence number, a hash of the policy, or any other appropriate identifier associated with the particular encryption policy protocol being used).

In some embodiments, the SPI is used to detect whether another group member is using stale policy. For example, group member 12(2) can insert the current SPI into each message that is generated (e.g., by encrypting a client's content for transmission via network 5) by group member 12(2). Similarly, other group members maintain their own copy of the SPI and insert their SPI value into the messages those other group members generate. Group member 12(2) can compare its own SPI with the SPI in a received message in order to determine whether the group member that generated the received message is using the current policy (at least as perceived by group member 12(2)). Group member 12(2) can also maintain the SPI associated with each unexpired policy that group member 12(2) has received from the key server. These SPIs can be compared to SPIs in received messages in order to determine whether the group members that generated the received messages are using valid unexpired policies.

In alternative embodiments, group members that are configured to participate in a stale policy detection scheme can generate additional metadata for inclusion in messages. This metadata includes a policy identifier that identifies the policy used to encrypt each message, as well as the identity of the group member that generated each message. Accordingly, in such embodiments, group member 12(2) can compare the metadata in a received message to a policy identifier maintained by group member 12(2) in order to detect whether the message was encrypted using stale policy.

Figure 3A:
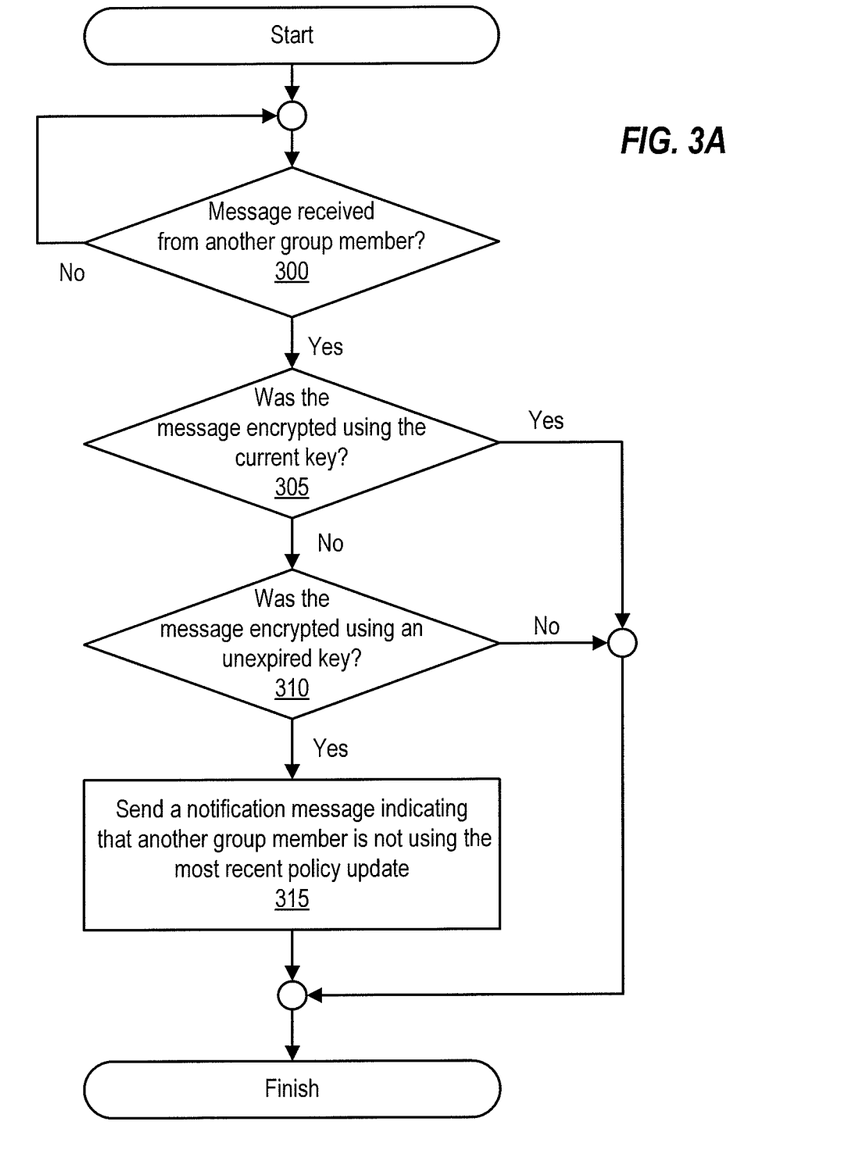
FIG. 3A is a flowchart of a method performed by a group member to detect and handle stale messages received from another group member, according to another embodiment.

FIG. 3A is a flowchart of a method performed by a group member to detect and handle stale messages received from another group member, according to another embodiment. This method can be performed by a group member, such as group member 12(2) of FIG. 2.

The method begins at 300, when a message is received from another group member. In response to receiving a message, the receiving group member determines whether the message was encrypted using the current key, as shown at 305. This determination can be performed in a variety of ways, as described in more detail below with respect to FIGS. 3B and 3C. In general, the receiving group member compares information within the received message with information that is maintained by the receiving group member. The information in the received message is indicative of the version of the policy in use by the other group member (i.e., the group member that generated the received message). The information maintained by the receiving group member is indicative of the version of the policy in use by the receiving group member. If the compared information is the same, the receiving group member determines that the other group member is using the current policy. Thus, if the comparison indicates that the information is the same, the receiving group member determines that the received message was encrypted using the current key. In this situation, no notification needs to be sent, since the group member that generated the received message is using the current policy.

If the information is not the same, the receiving group member determines that the message was not encrypted using the current key. In this situation, the receiving group member can also determine whether the message was encrypted using an unexpired key, as shown at 310. As with operation 305, performance of operation 310 involves comparing the information within the received message to information maintained by the receiving group member. In this case, the information within the received message is the same information that indicates the version of the policy in use by the other group member. The information maintained by the receiving group member indicates one or more versions of the policy that the receiving group member has received from the key server and that have not yet expired, but that are no longer the current policy.

At any given time, the receiving group member may maintain information identifying zero or more unexpired policies. (Each policy can be associated with information identifying the time at which that policy expires.) If the comparison at 310 indicates that the information in the received message does not match any of the information maintained by the receiving group member, or if the receiving group member does not currently identify any unexpired policies, the receiving group member determines that the group member that generated the received message is not using any identifiable policy. In this situation, the receiving group member does not need to generate any error message, since the group member that generated the received message appears to be using invalid, not stale, policy for the group.

If the comparison indicates that the information in the received message matches one of the unexpired policies, the receiving group member will determine that the group member that generated the received message is using a stale version of the policy. In response, the receiving group member will send a notification message, as shown at 315. At a minimum, this message is sent either to the key server or towards (if not specifically to) the group member that generated the received message. In some embodiments, the receiving group member may send the notification message both to the key server and towards the group member that generated the received message. This message indicates, at least, that at least one group member is using stale policy. More details regarding the particular contents of notification messages are provided throughout the description below.

It is noted that in some situations, a group member that is itself using stale policy can receive a message from another group member that is using the current policy. In this situation, the stale group member will detect that the other group member is not using the current policy (as perceived by the stale group member). However, this stale group member will not have any information identifying the current policy. Accordingly, when the stale group member attempts to perform operation 310, the stale group member will determine that the other group member is not using an unexpired policy and will accordingly not send a notification message. Thus, by checking to see if the received message was encrypted using a valid (i.e., existing and unexpired) but stale key, group members can avoid sending "false positive" notification messages in situations in which it is the receiver, not the sender, using stale policy.

In the embodiment illustrated in FIG. 3A, the receiving group member checks both whether the received message was encrypted using the current key and whether the received message was encrypted using an unexpired but stale key before sending a notification message. In alternative embodiments, the receiving group member may perform one but not both of these operations. For example, the receiving group member can simply perform operation 310 to check whether the received message was encrypted using a stale but unexpired key without first checking to see whether the received message was encrypted using the current key (however, if several unexpired policies are available, this may significantly increase the number of comparisons needed to be performed for each message, especially if situations in which group members have stale policy are expected to be somewhat rare). Similarly, the receiving group member may simply perform operation 305 without subsequently performing operation 310 (however, this can cause notification messages to be sent in situations in which the other group member is actually using invalid, not stale, policy).

In some alternative embodiments, instead of determining whether the information in the received message is the same as the locally maintained information, the receiving group member can determine whether the information in the received message identifies a policy that is the same as or more recent than the policy identified by the locally maintained information. For example, the key server can associate a timestamp, sequence, hash, or other policy instance information with each policy. This policy instance or other information can be used as the policy identifier. In such situations, the receiving group member can simply determine whether the information in the received message indicates a time that is the same as or more recent than the time maintained locally. If timestamps are used, this comparison could be performed by determining whether the timestamp in the received message is greater than or equal to the locally maintained timestamp. Here, if the comparison indicates that the received message was generated using a policy that is the same as or more recent than the policy in use by the receiving group member, the receiving group member will take no further action. If however the comparison indicates that the received message was generated using a policy that is less recent than the policy in use by the receiving group member, the receiving group member will send a notification message.

Figure 3B:
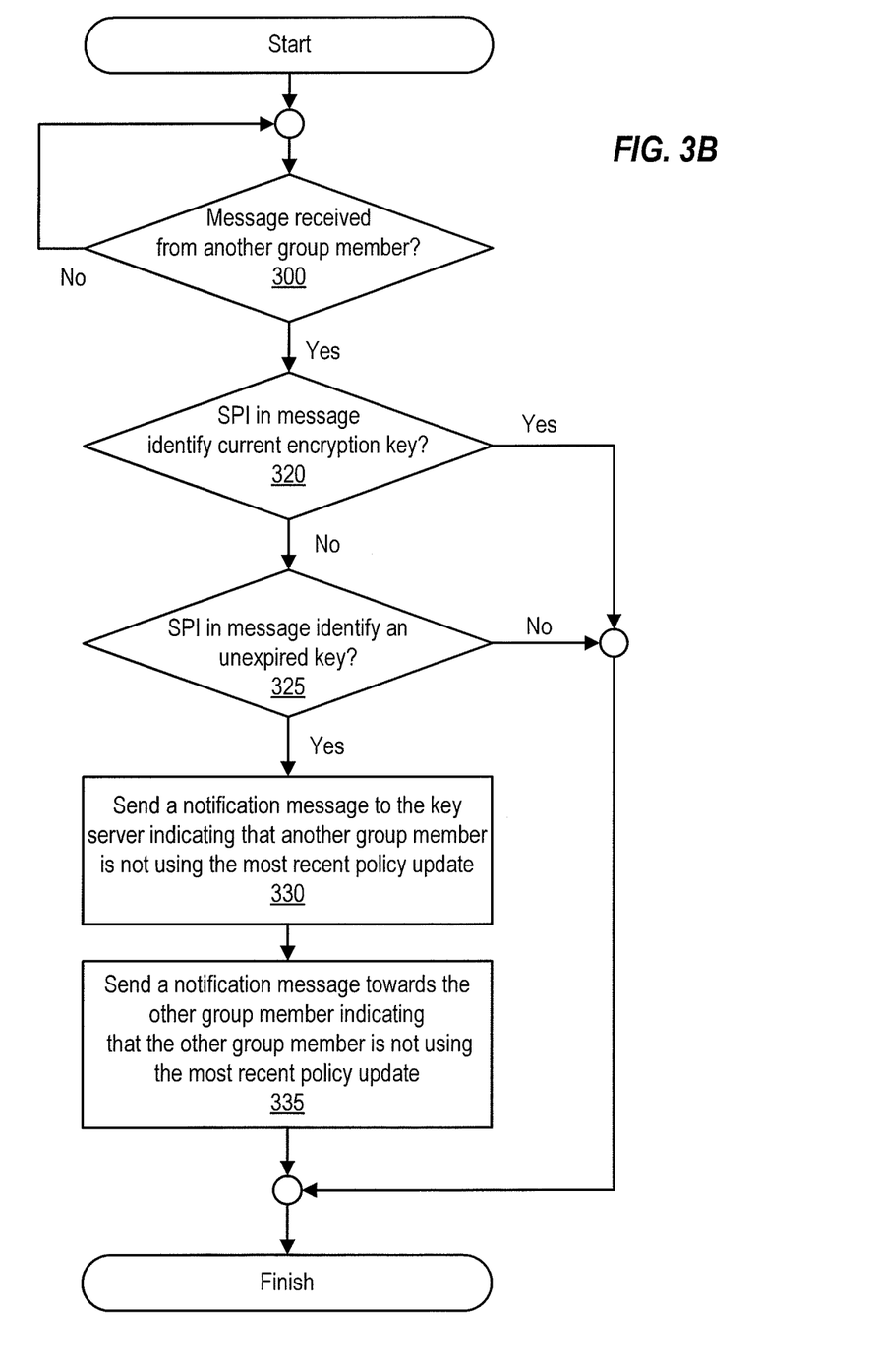
FIG. 3B is a flowchart of a method performed by a group member to detect and handle stale messages received from another group member, according to another embodiment.

FIG. 3B illustrates a method of detecting and handling stale group members based upon the SPI included in messages exchanged between group members. In this method, in response to receiving a message from another group member at 300, the receiving group member determines whether a SPI in the received message identifies the current encryption key, as shown at 320. To perform operation 320, the receiving group member can compare the SPI in the received message with information the receiving group member uses to fill the SPI field in messages generated by the receiving group member. If the SPI in the received message is the same as the SPI maintained by the receiving group member, the receiving group member will determine that the other group member is using the same policy as the receiving group member and that no notification message needs to be sent.

If the SPI in the received message is not the same as the SPI associated with the policy currently being used by the receiving group member, the receiving group member will then determine whether the SPI in the received message identifies a stale but unexpired key, as shown at 325. This determination can be performed by comparing the SPI in the received message with one or more SPIs, maintained by the receiving group member, that are each associated with a policy that was received by the receiving group member prior to receipt of the current policy and that has not yet expired. If the SPI in the received message does not match any of the SPI(s) maintained by the receiving group member, or if the receiving group member does not currently maintain any SPIs for valid but unexpired policies, the receiving group member will determine that the group member that generated the received message is using an invalid policy. In this situation, the receiving group member does not need to send a notification message, since the group member that generated the received message is not using stale policy.

If the SPI in the received message does match one of the SPI(s) maintained by the receiving group member, the receiving group member determines that the group member that generated the received message is using stale policy. In response, the receiving group member sends a notification message to the key server, as shown at 330. This notification message indicates that another group member is not using the most recent policy contained in the most recent policy update sent by the key server. The notification message can also provide information indicating which group member is using stale policy. For example, the notification message can include the IP address of the client that generated the contents of the received message (as described above, the group member that generated the received message receives messages from clients and then encrypts those messages for secure transmission to other group members). The key server may use this IP address to select (or at least narrow down the choices for) the stale group member, if the key server maintains information indicating which clients are coupled to which group members.

The receiving group member also sends a notification message towards the group member that generated the received message, as shown at 335. This notification message indicates that the other group member (i.e., the group member that generated the message received at 300) is not using the most recent policy update. This notification message can be sent to the IP address used as the source IP address of the received message (i.e., the IP address of the client that generated the contents of the message that were encrypted by the other group member can be used as the destination address of the notification message). It is noted that if there are multiple paths to that IP address from the receiving group member, there is a chance that the notification message will not be received the other group member, which is the notification message's intended destination. If the notification message is received by the other group member, the other group member will process and discard the notification message without sending the notification message on to the client identified by the IP address.

The notification message sent at 335 can indicate that the other group member is not using the most recent policy update in a variety of different ways. In one embodiment, this notification message can include information (e.g., identifying a special value, command, or instruction) that causes the other group member to request the current policy from the key server upon receipt and processing of the notification message. Alternatively, the notification message can indicate that the other group member is using stale policy by virtue of including a copy of the most recent policy sent by the key server (typically, policies are encrypted for secure transmission from the key server to group members, and thus the copy included in the notification message would be a copy of the encrypted policy). Upon receiving such a notification message, the other group member can simply extract the most recent policy from the notification message and begin using the extracted policy.

Other embodiments can implement similar methods to that shown in FIG. 3B. For example, one alternative embodiment can detect whether another group member is using stale policy by simply performing operation 325, without also performing operation 320. Similarly, some alternative embodiments can simply send a notification message to the key server by performing operation 330, without also sending a notification message to the other group member by performing operation 335.

Figure 3C:
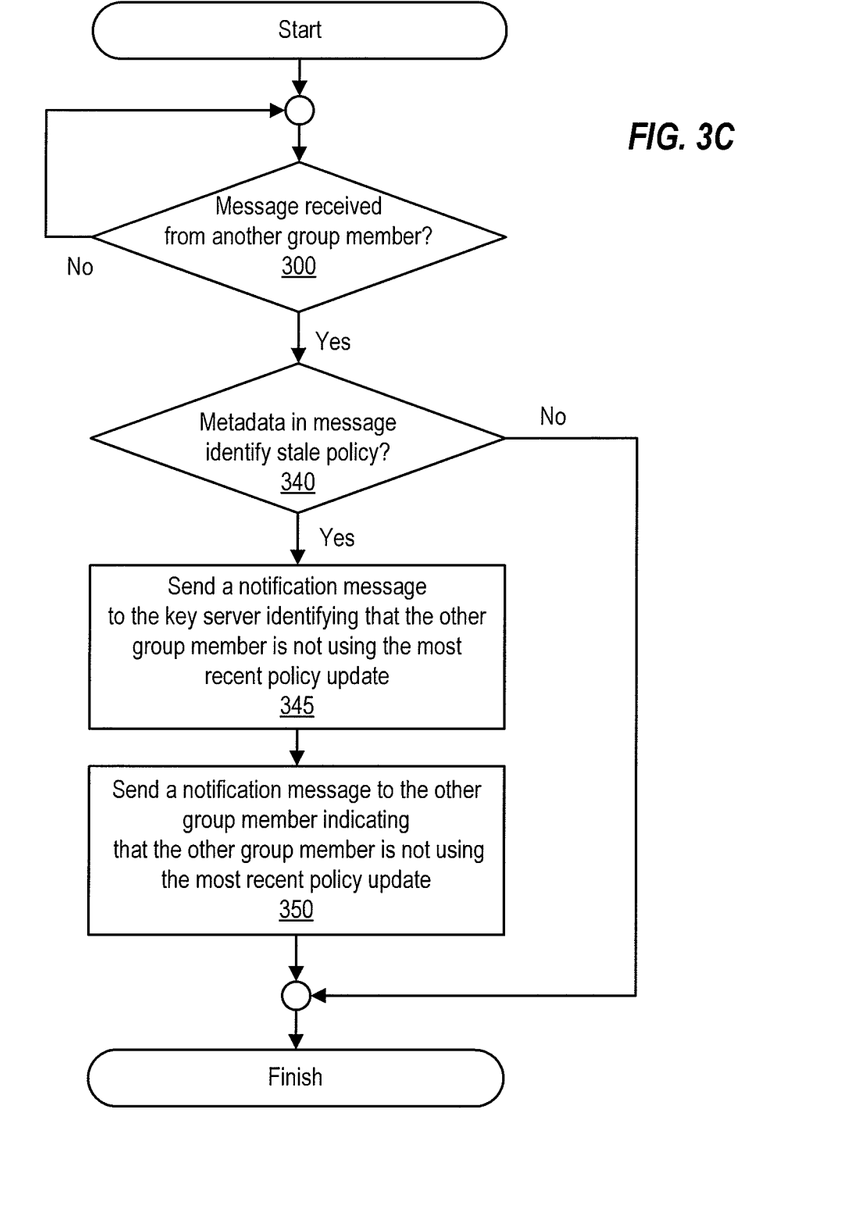
FIG. 3C is a flowchart of a method performed by a group member to detect and handle stale messages received from another group member, according to yet another embodiment.

FIG. 3C illustrates yet another embodiment of a method of detecting and handling stale group members that can be performed by a group member. This method relies upon each group member within the network to generate metadata and to insert that metadata into each message sent through the network.

The metadata generated by a group member identifies the current policy in use by that group member, as well as the network address (e.g., IP address, media access control (MAC) address, or the like) of that group member. Each time a group member receives a new policy from the key server, the group member will update its metadata.

In some embodiments, at least some of the metadata is generated by the key server and distributed as part of policy updates. For example, the key server can generate a policy identifier for each policy update, and the group member can use this policy identifier as part of the metadata. The policy identifier can include and/or be associated with a timestamp (e.g., identifying the relative or actual time at which the identified policy was distributed to group members).

Figure 4:
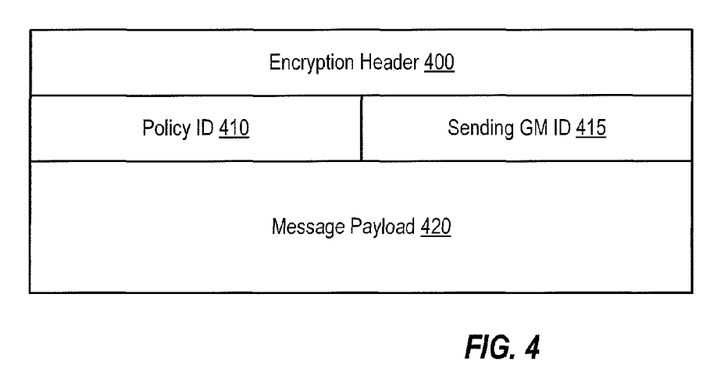
FIG. 4 is a block diagram of a message with a header that includes a policy identifier and a sending group member identifier, according to one embodiment.

The metadata can be included as a special header (e.g., as shown in FIG. 4) or within the payload of each message sent through the network. In some embodiments, this metadata can be encrypted or otherwise protected. For example, the metadata can be encrypted using the same encryption keys used to protect communication between the key server and the group members.

Alternatively, the metadata can be encrypted using the current key in use by the sending group member. Group members can only participate in the group encryption scheme if the group members have access to unexpired keys. Accordingly, embodiments that encrypt metadata in this manner ensure that the sending group member is either a valid group member (e.g., using the most recent policy update) or was a valid member of the group within the last policy update interval (i.e., using the next most recent policy update, which has still not expired). This can also prevent a network device from using expired keys to induce inappropriate behavior (e.g., by causing a flood of messages indicating that a group member is stale) into the system. In these embodiments, each group member can retain all unexpired keys, for use in attempting to decrypt metadata that is not encrypted using the current key. When a message containing encrypted metadata is received, the receiving group member can first attempt to decrypt the metadata using the current key. If unsuccessful (e.g., as determined based on a checksum or hash included in and/or calculated from the decrypted data), the receiving group member can attempt to decrypt the metadata using one or more unexpired keys.

In response to receiving a message from another group member, as shown at 300, the receiving group member will parse the metadata in the received message (after decrypting the metadata, if needed). If the metadata identifies the current policy in use by the receiving group member (e.g., as determined by comparing a policy identifier within the metadata to a policy identifier maintained by the receiving group member), no further action needs to be taken. However, if the metadata does not identify the current policy, the receiving group member determines that the other group member is using stale policy (in some embodiments, the receiving group member may also compare the policy identifier in the metadata to policy identifiers of stale but unexpired policies before making this determination, in a manner similar to that shown in FIGS. 3A and 3B).

If the other group member is using stale policy, the receiving group member sends a notification message to the key server, as shown at 345. This notification message indicates that the other group member is not using the most recent policy contained in the most recent policy update sent by the key server. This notification message also identifies the other group member, using the network address contained within the metadata in the received message.

The receiving group member can also send a notification message to the other group member, as shown at 350. This notification message is sent directly to the group member (as opposed to being sent to a client coupled to the other group member, as was described above with respect to FIG. 3B), using the network address contained within the metadata in the received message. This notification message indicates that the other group member is not using the most recent policy distributed by the key server. For example, this notification message can provide this indication by instructing or otherwise causing the other group member to request updated policy from the key server or by simply including a copy of the most recent policy update. In some embodiments, in addition to including the copy of the most recent policy update, the notification message can also include timing information identifying an amount of time that elapsed between the time the receiving group member originally received the most recent policy update and the time the receiving group member sends the notification message.

Since the other group member is not using the current policy, the receiving group member cannot communicate within the other group member in a manner that is protected by the current encryption scheme. Accordingly, if it is desired to protect this notification message (e.g., in order to prevent denial-of-service attacks on the key server caused by a malicious network device sending fraudulent notification messages to group members), the receiving group member may use one of several different techniques to do so. For example, the receiving group member can encrypt this message using the stale but unexpired key being used by the other group member. Alternatively, the receiving group member can encrypt this message using the same key used to encrypt communications between the key server and group members.

In other embodiments, a group member can use metadata within a received message to detect stale group members without performing all of the operations shown in FIG. 3C. For example, in some alternative embodiments, the group member may send a notification message to one, but not both, of the key server and the other group member.

In some situations, a user may wish to transition an existing network into a network that implements stale group member detection using one of the techniques described above. In such situations, some group members (e.g., that have not yet been replaced or upgraded) may not be able to interpret notification messages. If it is desirable to allow mixed networks that include group members that support these techniques as well as group members that do not support these techniques, any such notification messages and/or additional metadata within normal data traffic should be implemented in such a manner that such messages and/or metadata can be disregarded by group members that do not implement these techniques.

Alternatively, mixed networks can be supported by having group members that do support these techniques be operable in two different modes. One mode can implement one or more of the techniques described herein, while the other mode does not. While the network is in a mixed state, all group members can be configured to operate in the latter mode. Once all group members in the network have been replaced with group members that support these techniques and/or upgraded to support these techniques, all of the group members within the network can then be configured to operate in the mode that does implement these techniques.

FIG. 4 provides an example of a message that includes special metadata for use in detecting stale group members. As shown, the message includes a standard encryption header 400. Header 400 can include the source and destination IP addresses of the encrypted message. Following header 400 is a set of metadata that includes policy identifier (ID) 410 and sending group member (GM) identifier 415. As described above, the policy identifier 400 and group member identifier 415 can be encrypted using the encryption keys and policy currently in use by the sending group member (for either the encryption of data traffic or for the encryption of traffic exchanged between the key server and group members). Following the metadata is the normal encrypted message payload 420.

Figure 5A:
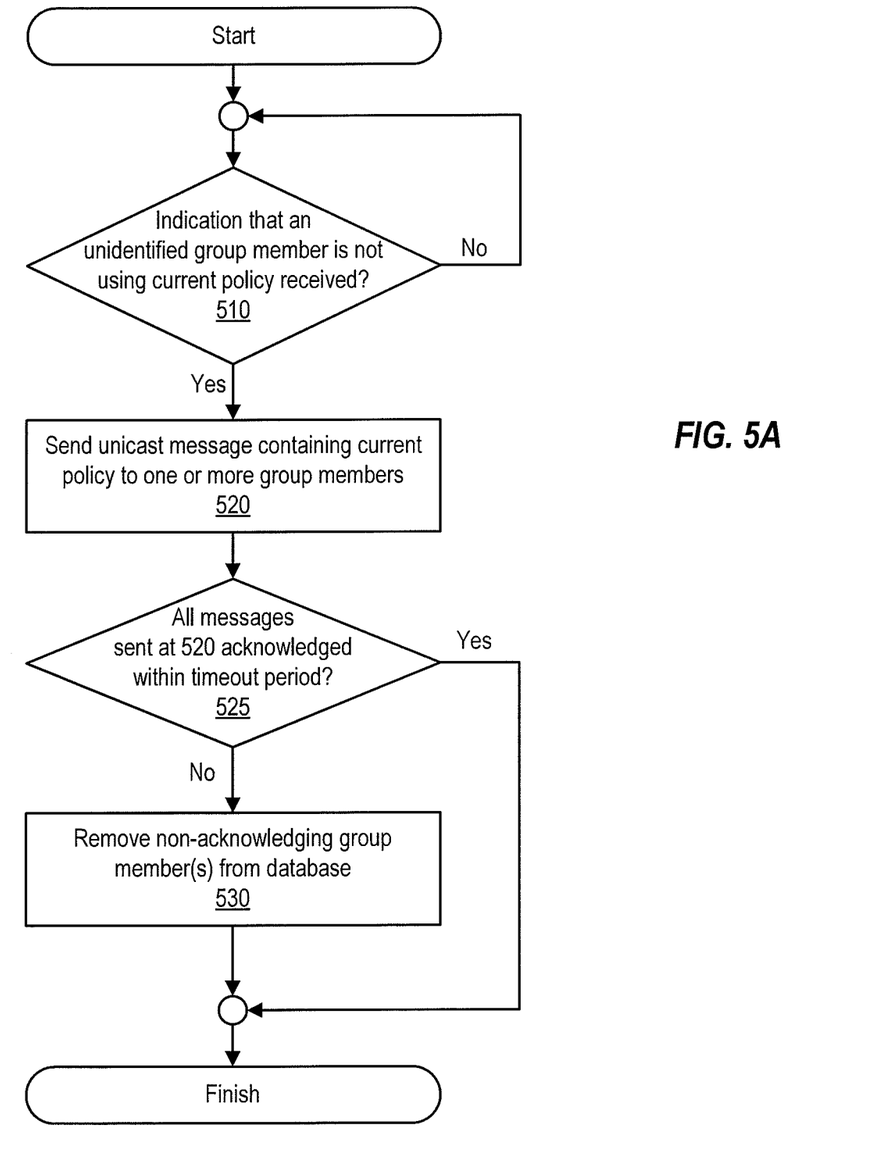
FIG. 5A is a flowchart of a method that can be performed by a key server, in response to detecting that one or more group members may have stale policy, according to one embodiment.

FIG. 5A is a flowchart of a method that can be performed by a key server, in response to detecting that one or more group members may have stale policy. A key server implementing this method can be used in conjunction with group members that implement the method described in FIG. 3B.

The method begins when the key server detects an indication that an unidentified group member is not using the current policy, as shown at 510. Here, the indication can be a notification message that does not specifically identify (e.g., by network address) which group member is using stale policy. However, the notification message may include other information (e.g., such as the IP address of the client whose message was encrypted by the stale group member) that may be used to determine the identity of the stale group member or to at least narrow down a subset of group members that includes the stale group member.

In response to receiving such an indication, the key server can send a unicast message containing the current policy to one or more group members, as shown at 520. These unicast messages request acknowledgement. In some situations, the key server may send the unicast messages to all group members. If it is possible to narrow down the potential stale group members to a subset of the group members (e.g., based upon other information in the notification message), the key server may instead only send the unicast message to that subset of the group members.

If all of the messages sent at 520 are acknowledged within the timeout period associated with the unicast messages, the key server can determine that all of the group members to which the unicast messages were sent successfully received those messages. Accordingly, no further action needs to be taken. Any stale group member that received the unicast message will have received the current policy and will thus no longer be stale.

If instead one or more of the unicast messages is not acknowledged within the timeout period, as detected at 525, the key server will update its database of current group members to exclude any group member that failed to acknowledge the unicast message, as shown at 530. Here, any group member that does not acknowledge the unicast message is presumed to have not successfully received the unicast message and to therefore be a stale group member.

Figure 5B:
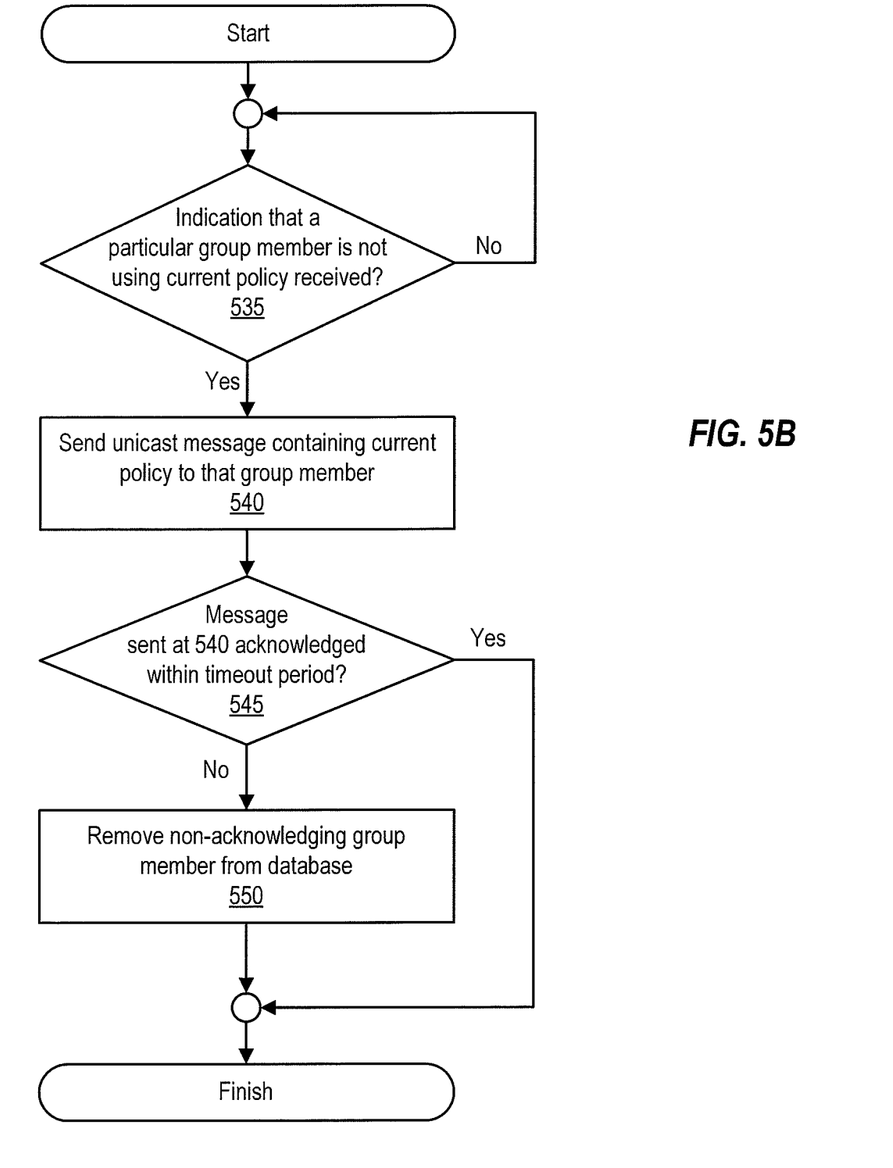
FIG. 5B is a flowchart of a method that can be performed by a key server, in response to detecting that one or more group members may have stale policy, according to another embodiment.

FIG. 5B is a flowchart of a method that can be performed by a key server, in response to detecting that one or more group members may have stale policy. A key server implementing this method can be used in conjunction with group members that implement the method described in FIG. 3C.

The method begins with the key server receiving an indication that a particular group member is not using the current policy, as shown at 535. Here, the indication specifically identifies (e.g., by network address) the stale group member. The indication can be a notification message containing the network address of the stale group member.

At 540, the key server sends a unicast message containing the current policy to the identified stale group member. If the group member acknowledges the unicast message within the timeout period, as detected at 545, the key server determines that the group member is no longer a stale group member and retains information identifying that group member in its database. If the group member fails to acknowledge the unicast message, however, the key server will instead determine that the group member is not able to receive the current policy and will remove the group member from its database, as shown at 550.

Figure 6A:
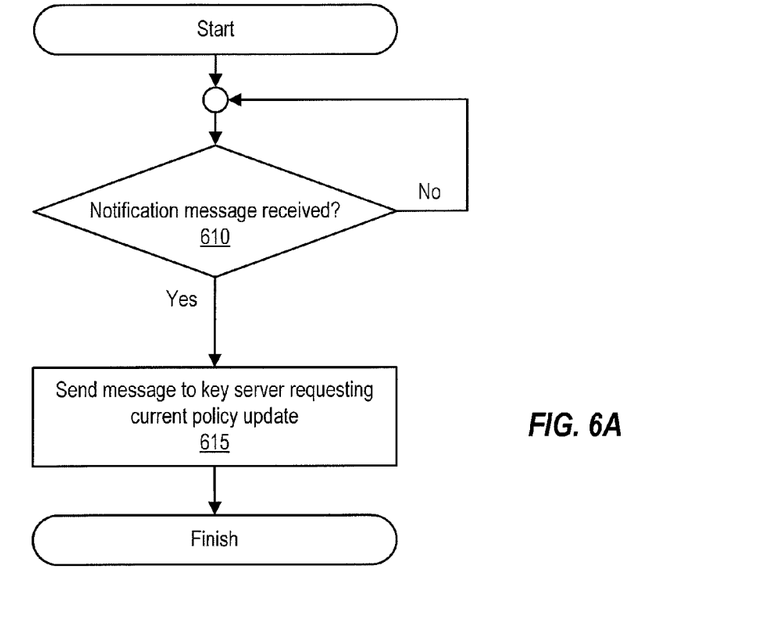
FIG. 6A is a flowchart of a method that can be performed by a group member, in response to receiving a message indicating that the group member may be using stale policy, according to one embodiment.

FIG. 6A is a flowchart of a method that can be performed by a group member, in response to receiving a message indicating that the group member may be using stale policy. This method begins at 610, when the group member receives a notification message from another group member. In some embodiments, this notification message may not actually be addressed to the group member; instead, as described above, the notification message may be addressed to a client for which the group member performs encryption. In alternative embodiments (e.g., in which group member insert the extra metadata into messages, as shown in FIG. 4), however, this message may be addressed to the group member itself and not to a client.

In response to receiving such a notification message, the group member can send a request for the current policy update to the key server, as shown at 615. This will prompt the key server to resend the current policy to the requesting group member.

Figure 6B:
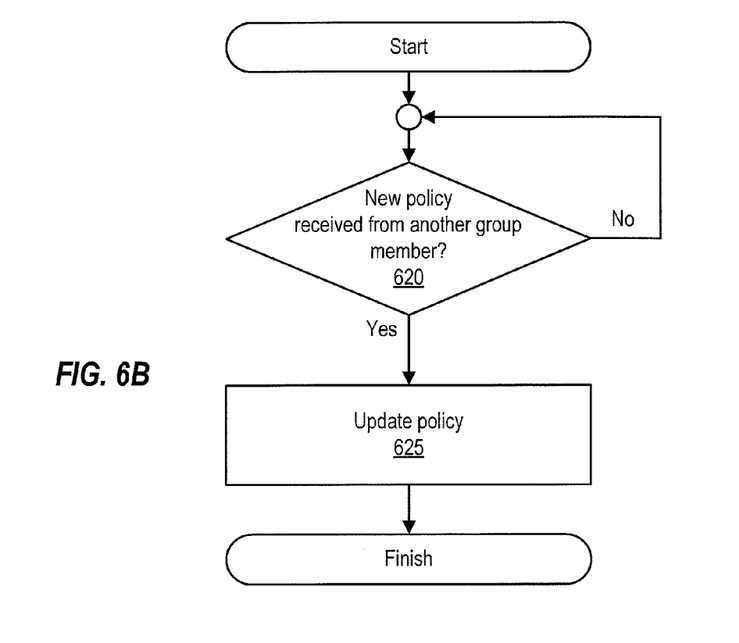
FIG. 6B is a flowchart of an alternative method that can be performed by a group member, in response to receiving a message indicating that the group member may be using stale policy, according to another embodiment.

FIG. 6B is a flowchart of an alternative method that can be performed by a group member, in response to receiving a message indicating that the group member may be using stale policy. This method begins when the group member receives a copy of the current policy from another group member, as shown at 620. This copy may be identical to the copy sent by the key server, such that the group member receiving the copy cannot identify that the copy was sent by another group member instead of the key server.

In response to receiving the current policy, the group member updates its policy. Accordingly, the group member will no longer be using stale policy subsequent to receiving and processing the copy of the current policy.

Figure 7:
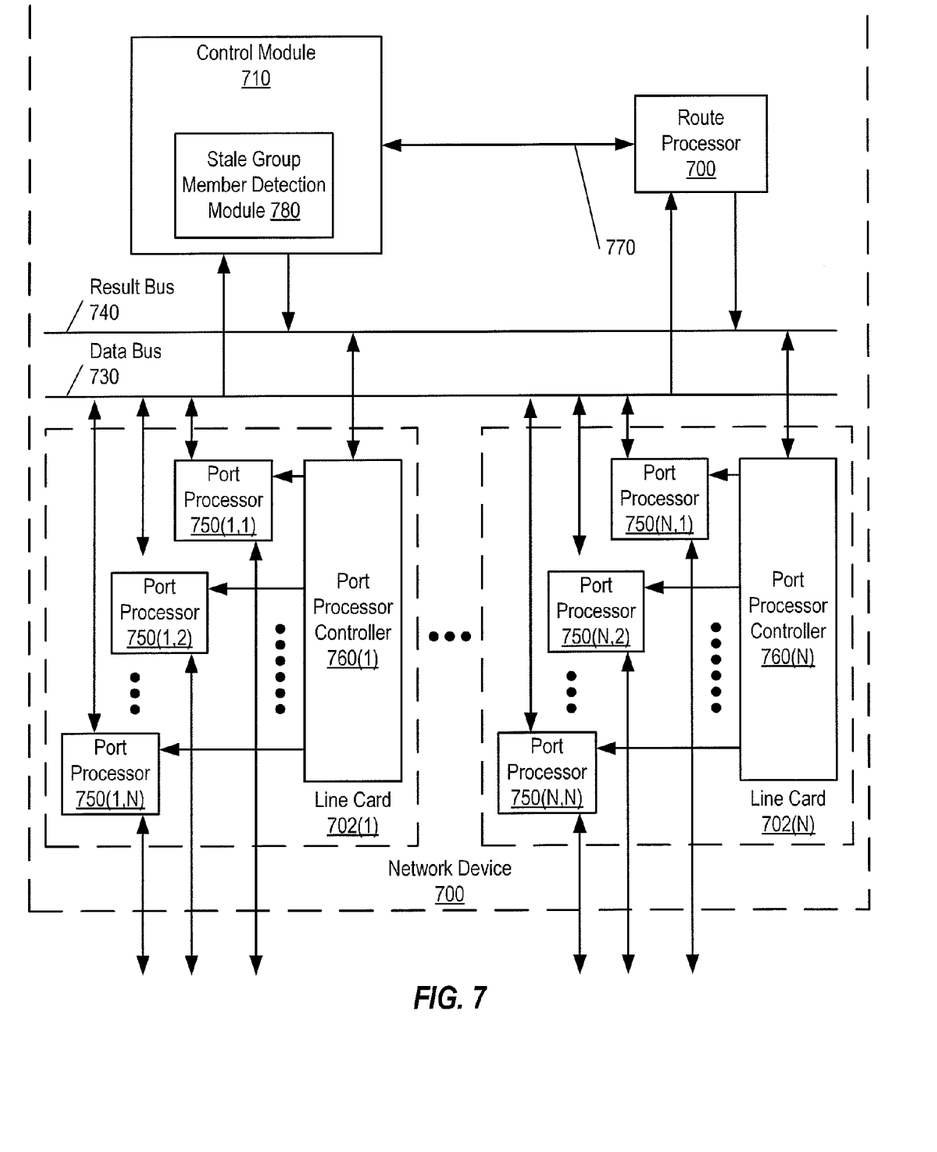
FIG. 7 is a block diagram of a network device, according to one embodiment.

FIG. 7 is a block diagram of a network device 700 (e.g., key server 10 and/or group members 12(1)-12(3) of FIG. 1). In this depiction, network device 700 includes a number of line cards (line cards 702(1)-702(N)) that are communicatively coupled to a control module 710 (which can include a forwarding engine, not shown) and a route processor 700 via a data bus 730 and a result bus 740. Line cards 702(1)-(N) include a number of port processors 750(1,1)-750(N,N) which are controlled by port processor controllers 760(1)-760(N). It will also be noted that control module 710 and route processor 700 are not only coupled to one another via data bus 730 and result bus 740, but are also communicatively coupled to one another by a communications link 770. It is noted that in alternative embodiments, each line card can include its own forwarding engine.

When a message is received, the message is identified and analyzed by a network device such as network device 700 in the following manner. Upon receipt, a message (or some or all of its control information) is sent from one of the port processors 750(1,1)-750(N,N) at which the discovery message was received to one or more of those devices coupled to data bus 730 (e.g., others of port processors 750(1,1)-750(N,N), a forwarding engine, and/or route processor 700). Handling of the message can be determined, for example, by a forwarding engine. For example, a forwarding engine may determine that the message should be forwarded to one or more of port processors 750(1,1)-750(N,N). This can be accomplished by indicating to corresponding one(s) of port processor controllers 760(1)-760(N) that the copy of the discovery message held in the given one(s) of port processors 750(1,1)-750(N,N) should be forwarded to the appropriate one of port processors 750(1,1)-750(N,N).

Network device 700 can implement a stale group member detection modules 780 (e.g., in control module 710, as shown, or in one of port processor controllers 760(1)-760(N) and/or in route processor 700) in order to act as a group member that detects stale group members, a group member that receives to a notification message indicating that the group member is using stale policy, and/or a key server that responds to notification message indicating that a group member is using stale policy. Stale group member detection module 780 can thus implement one or more of the methods illustrated in FIGS. 3A-3C, 5A-5B, and 6A-6.

Figure 8:
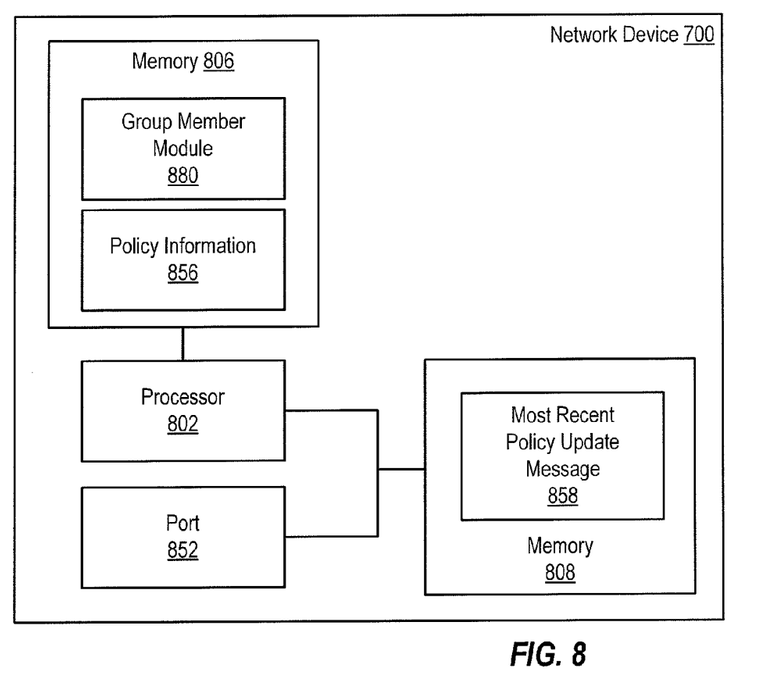
FIG. 8 is a block diagram of a network device configured to act as a group member, according to one embodiment.

FIG. 8 is another block diagram of a network device 700, in which the network device is configured as a group member (e.g., one of group members 12(1)-12(3) of FIG. 1). As illustrated, network device 700 includes one or more processors 802 (e.g., microprocessors, PLDs (Programmable Logic Devices), or ASICs (Application Specific Integrated Circuits)) configured to execute program instructions stored in memories 806 and/or 808. Memories 806 and 808 can include various types of RAM (Random Access Memory), ROM (Read Only Memory), Flash memory, MEMS (Micro Electro-Mechanical Systems) memory, and the like. Network device 700 also includes one or more ports 852 (e.g., one or more hardware ports or other network interfaces that can be linked to other network devices, hosts, servers, storage devices, or the like). Processor 802, port 852, and memories 806 and 808 are coupled to send and receive data and control signals by one or more buses or other interconnects.

In this example, program instructions executable to implement a group member module 880 are stored in memory 806. Group member module 880 includes the functionality needed to act as a group member within a group encryption scheme, including stale group member detection (e.g., to perform one of the methods illustrated in FIGS. 3A-3C) as well as to respond to notification messages indicating that the group member is using stale policy (e.g., to perform one of the methods illustrated in FIGS. 6A and 6B). Policy information 856 identifying all unexpired policies can also be stored in memory 806. The most recent policy update message 758 can be stored in memory 808.

Figure 9:
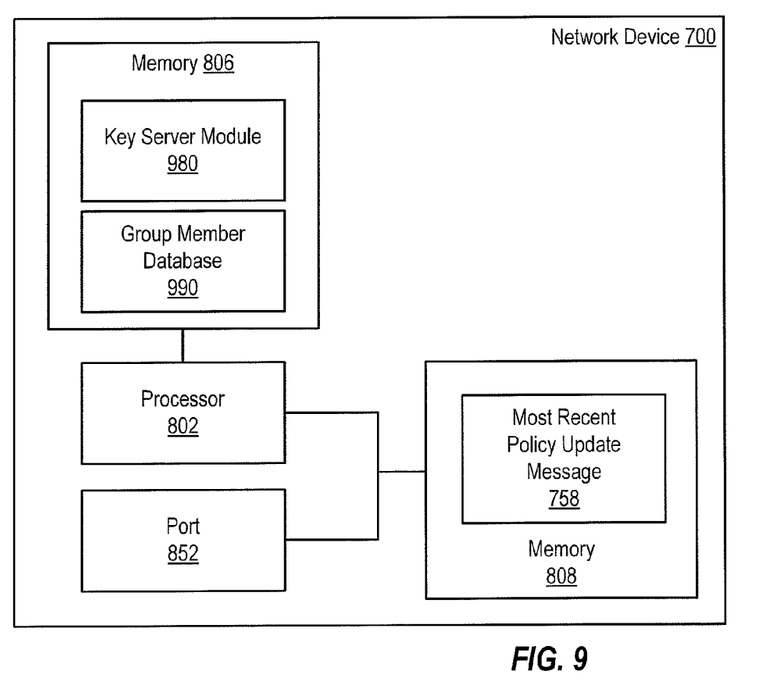
FIG. 9 is a block diagram of a network device configured to act as a key server, according to one embodiment.

FIG. 9 is a block diagram of network device 700, in which the network device is configured as a key server (e.g., key server 10 of FIG. 1). In this example, program instructions executable to implement a key server module 980 are stored in memory 806. Key server module 980 includes the functionality needed to act as a key server within a group encryption scheme, including functionality to respond to notification messages indicating that a group member is using stale policy (e.g., to perform one of the methods illustrated in FIGS. 5A and 5B). All or part of a group member database 990 identifying all current group members can also be stored in memory 806. The most recent policy update message 758 can be stored in memory 808.

It is noted that the program instructions and/or data executable to implement key group member module 880 and key server module 980 can be stored on various computer readable storage media such as a memory (e.g., RAM (Random Access Memory)). In some embodiments, such software is stored on a computer readable storage medium such as a CD (Compact Disc), DVD (Digital Versatile Disc), hard disk, optical disk, tape device, floppy disk, and the like). In order be executed, the software is loaded into memory from another computer readable storage medium. The instructions and/or data can also be transferred to a computing device for storage in memory via a network such as the Internet or upon a carrier medium. In some embodiments, the instructions and/or data are conveyed using a carrier medium such as a network and/or a wireless link upon which signals such as electrical, electromagnetic, or digital signals.

Although the present invention has been described with respect to specific embodiments thereof, various changes and modifications may be suggested to one skilled in the art. It is intended such changes and modifications fall within the scope of the appended claims.

What is claimed is:

1. A method, comprising:
  receiving one or more policy messages via a control plane of a network;
    receiving a message from a first group member of a group via a data plane of the network, wherein
    the message comprises client content encrypted by the first group member using a first encryption policy applicable to the group,
    the message is received by a second group member of the group,
    the second group member is a network device,
    the control plane carries messages containing policy information used to manage an encryption scheme,
    the encryption scheme is implemented by the group,
    the group comprises the first and second group members, and
    the data plane carries messages containing content generated by clients of the first and second group members;

in response to the receiving the message
    decrypting information in the message using an unexpired key, wherein the unexpired key existed prior to a time at which the most recent policy update was generated by a key server, and
    detecting that the first encryption policy differs from the most recent policy update supplied by the key server, wherein the most recent policy update is applicable to the group, and
        the detecting comprises comparing at least a portion of the decrypted information to information maintained by the second group member, wherein the information maintained by the second group member indicates the most recent policy update received by the second group member; and
    sending a notification message from the second group member, wherein the notification message indicates that at least one group member is not using the most recent policy update.

2. The method of claim 1, wherein the detecting comprises comparing a first value included in the message with a second value maintained by the second group member, and wherein the second value identifies a key currently used by the second group member to decrypt messages.

3. The method of claim 1, wherein the notification message is sent to the key server.

4. The method of claim 3, wherein the notification message identifies the first group member.

5. The method of claim 3, further comprising: sending a second notification message to the first group member, wherein the second notification message indicates that the first group member is not using the most recent policy update.

6. The method of claim 1, wherein the notification message is sent to the first group member.

7. The method of claim 6, wherein the notification message comprises the most recent policy update.

8. A first network device, wherein the first network device comprises:
    a plurality of hardware ports, wherein
        each of the plurality of hardware ports is configured to be coupled to a network,
        the plurality of hardware ports is configured to receive policy messages
            via a control plane of the network and to receive a message sent by a second network device of a group via a data plane of the network,
        the message comprises client content encrypted by the second network device using a first encryption policy applicable to the group,
        the control plane carries messages containing policy information used to manage an encryption scheme,
        the encryption scheme is implemented by the group,
        the group comprises the first network device and the second network device, and
        the data plane carries messages containing content generated by clients of the first and second network devices;
    a processor coupled to the plurality of hardware ports and configured to implement a stale policy detection module, wherein the stale policy detection module is configured to:
        decrypt, in response to receiving the message, information in the message using an unexpired key, wherein the unexpired key existed prior to a time at which the most recent policy update was generated by a key server, and
        detect, in response to the receiving the message, that the first encryption policy differs from the most recent policy update supplied to the first network device by the key server, wherein the most recent policy update is applicable to the group, and
        detecting that the first encryption policy differs from the most recent policy update comprises comparing at least a portion of the decrypted information to information maintained by the first network device, wherein the information maintained by the first network device indicates the most recent policy update received by the first network device; and
        send a notification message, via one of the plurality of hardware ports, if the second network device is not using the most recent policy update, wherein the notification message indicates that at least one of a plurality of group members is not using the most recent policy update.

9. The first network device of claim 8, wherein the stale policy detection module is configured to:
    detect whether the second network device is using the most recent policy update by comparing a first value included in the message with a second value maintained by the first network device, wherein the second value identifies a key currently used by the first network device to decrypt messages.

10. The network first device of claim 8, wherein the notification message is sent to the key server.

11. The first network device of claim 10, wherein the stale policy detection module is configured to: send a second notification message to the second network device via the plurality of hardware ports, wherein the second notification message indicates that the second network device is not using the most recent policy update.

12. The first network device of claim 8, wherein the notification message is sent to the second network device.

13. The first network device of claim 12, wherein the notification message comprises the most recent policy update.

14. A system, comprising:
    network interface means for receiving policy messages via a control plane of a network and a message from a first group member of a group via a data plane of the network, wherein
        the message comprises client content encrypted by the first group member using a first encryption policy applicable to the group,
        a second group member comprises the network interface means,
        the control plane carries messages containing policy information used to manage an encryption scheme,
        the encryption scheme is implemented by the group,
        the group comprises the first and second group members, and
        the data plane carries messages containing content generated by clients of the first and second group members;
    means for decrypting information in the message using an unexpired key,
        wherein the unexpired key existed prior to a time at which the most recent policy update was generated by a key server;
    means for detecting that the first encryption policy differs from the most recent policy update supplied by the key server, wherein
        the most recent policy update is applicable to the group, and
        the detecting comprises comparing at least a portion of the decrypted information to information maintained by the second group member, wherein the information maintained by the second group member indicates the most recent policy update received by the second group member; and means for sending a notification message from the second group member, wherein the notification message indicates that at least one group member is not using the most recent policy update.

15. The system of claim 14, wherein the notification message is sent to the key server.

16. The system of claim 14, wherein the notification message is sent to the first group member.

17. The system of claim 14, wherein the means for detecting comprise means for comparing a first value included in the message with a second value maintained by the second group member, and wherein the second value identifies a key currently used by the second group member to decrypt messages.

18. The method of claim 1, wherein the information indicates a version of the first encryption policy used by the first group member.

19. The method of claim 1, further comprising:

in response to detecting that the message was not encrypted using a key currently used by the second group member to decrypt messages, detecting whether the message was encrypted using the unexpired key for sending the notification message.

\* \* \* \* \*